United States Patent Office.

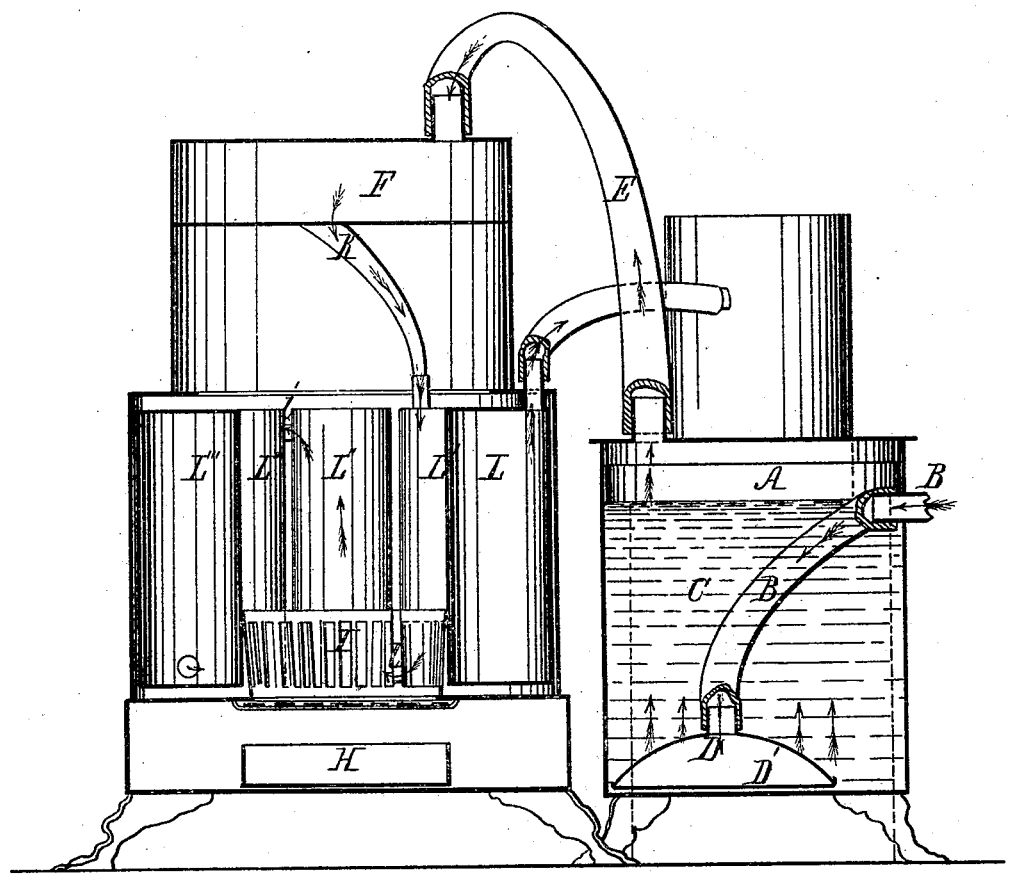

WILLIAM M. SLOAN, OF BUFFALO, NEW YORK, ASSIGNOR TO CAR CARPENTER.

Letters Patent No. 76,535, dated April 7, 1868.

IMPROVED APPARATUS FOR GENERATING GAS.

The Schedule referred to in these Letters Patent and making part of the same.

TO ALL WHOM IT MAY CONCERN:

Be it known that I, WILLIAM M. SLOAN, of Buffalo, in the county of Erie, and State of New York, have invented a new and improved Portable Gas-Generating Apparatus; and I do hereby declare that the following is a full, clear, and exact description of the construction and operation of the same, reference being had to th annexed drawings, making a part of this specification, in which—

The invention is represented by a longitudinal vertical section.

This invention consists, first, in providing within the carburetting-chamber a floating-vessel having a felt bottom, for the purposes hereinafter shown, and, secondly, in heating steam or air that has been carburetted, and thereby fixing it as a gas.

In the drawings, A represents the carburetting-chamber supplied with a current of steam or atmospheric air through a pipe, B, the part of which outside of the chamber A may be made of flexible or inflexible hose or gas-tube, and the portion of which, B', inside of the chamber, is to be constructed of flexible tubing.

C represents the carburetting-fluid or substance used in the chamber A. D is a hollow vessel or float resting on the liquid, C, and filled at the top with air or steam from the pipe B. Its bottom, D', consists of a piece of felt stretched tightly across and confined to the lower edges of the side walls. E is a pipe leading from the upper part of the chamber A to a hollow drum or vessel, F, situated over or near a fire-chamber, I, of a heater, H. The steam or air, having been forced through pipe B into vessel D, and escaping through every part of its felt bottom D', into the carburetting-fluid, and thence rising in bubbles to the upper portion of the chamber A, passes over through pipe E to drum F, where it is heated by means of a fire burning in fire-chamber I of the heater. Having thus been heated and partially fixed, the gas passes from drum F through pipe K into the first of a series of upright cylinders L L' L'' L''' arranged in a vertical position around the fire-pot I. Entering at the top of one of these cylinders it passes down through it, and escapes at its bottom through a short pipe or passage, $l$, into the bottom of the adjoining cylinder L', through which it rises, escaping in turn through the passage $l'$ into the top of the next adjoining cylinder L'', thence down and into the next, &c., &c., passing in this manner around the fire-pot, and finally escaping from the apparatus at the bottom or top of the cylinder L, the last of the series, when, after being passed through a cooling-apparatus, it is ready for use.

The object in passing the gas through the cylinders around the fire-pot is to heat it to a higher degree than it was when it escaped from the drum F. The arrangement of the cylinders, fire-pot, and drum F, as shown in the drawings, utilizes the heat of the heater to the highest degree. From the moment of entering the heater till it finally escapes from it, through all its long passage, the gas is constantly exposed to a large heated surface, which, in the course of its passage, reaches every part of it, and thoroughly heats it, changing or destroying particles of foreign matter in it, and giving the whole the character of a permanently-fixed illuminating-gas.

Instead of felt, any thick, porous cloth, which will operate in an equivalent manner, may be employed for the bottom of float D. And instead of arranging the retorts or cylinders L L$^1$ L$^2$, &c., vertically in a circle around the grate, as shown, they may be arranged horizontally, forming an arch over the fire, if preferred, any other position that will enable the heat to act upon them all to the greatest advantage.

Having thus described my invention, what I claim as new, and desire to secure by Letters Patent, is—

The combination of the carburetting-apparatus A B D, when constructed and operating as described, with the fire-chamber I, cylindrical retorts L L$^1$ L$^2$, &c., and pipe E, when the parts last mentioned are arranged in the manner set forth, the whole operating together substantially as and for the purpose specified.

WM. M. SLOAN.

Witnesses:
   D. A. HOVEY,
   GEO. BURT.